United States Patent [19]
Brunnee

[11] 3,837,147
[45] Sept. 24, 1974

[54] DEVICE FOR SEPARATING MIXTURES OF GASEOUS AND/OR VAPOROUS SUBSTANCES ESPECIALLY FOR SEPARATION OF CARRIER GAS IN DEVICES FOR GASCHROMATOGRAPHY

[76] Inventor: Curt Brunnee, 2820 Platjenwerbe, 24 Birkenweg, Germany

[22] Filed: Aug. 9, 1973

[21] Appl. No.: 386,938

Related U.S. Application Data
[63] Continuation of Ser. No. 185,834, Oct. 1, 1971, abandoned.

[52] U.S. Cl. .................................... 55/197, 55/277
[51] Int. Cl. .......................................... B01d 15/08
[58] Field of Search ......... 55/17, 67, 197, 277, 278, 55/386; 210/65; 23/254; 137/171, 592

[56] References Cited
UNITED STATES PATENTS
3,528,221  9/1970  Garrett et al. ........................ 55/277
3,678,656  7/1972  Brunner et al. ....................... 55/197

OTHER PUBLICATIONS
Ryhage, Analytical Chemistry, Vol. 36, No. 4, 4–64, pp. 759–764.

Primary Examiner—Charles N. Hart

[57] ABSTRACT

The invention relates to a device for separating mixtures of gaseous and/or vaporous substances which comprises a separating chamber for said mixture provided with an inlet for viscous flow, a first exit for molecular flow having the form of an elongated slit wherein the slit width preferably is adjustable, and a second exit for viscous flow, especially for separation of a carrier gas in devices for gaschromatography. (Compare U.S. Pat. application Ser. No. 25,919).

11 Claims, 12 Drawing Figures

PATENTED SEP 24 1974
3,837,147
SHEET 1 OF 2
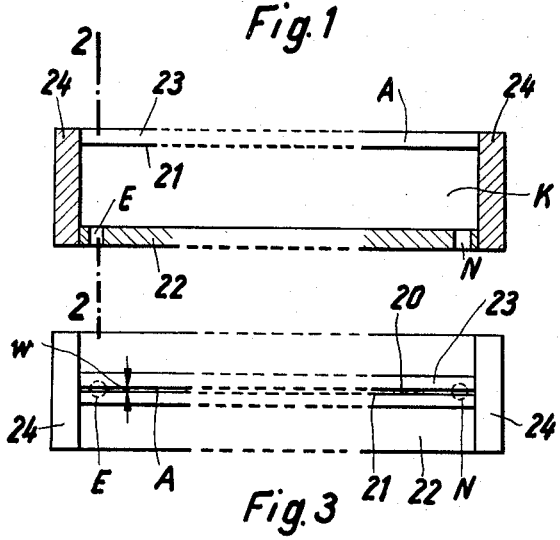
Fig. 1
Fig. 3
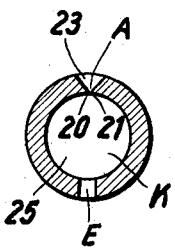
Fig. 2
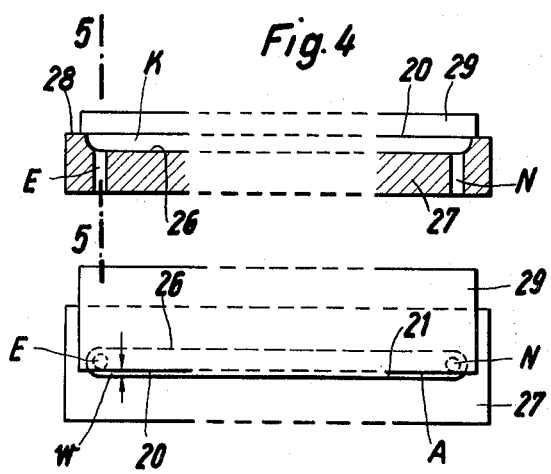
Fig. 4
Fig. 6
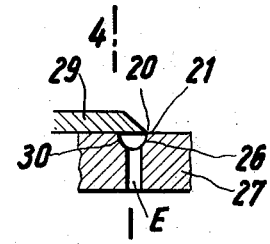
Fig. 5

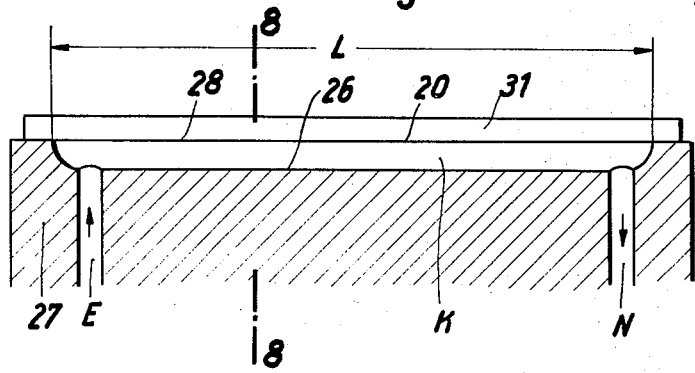
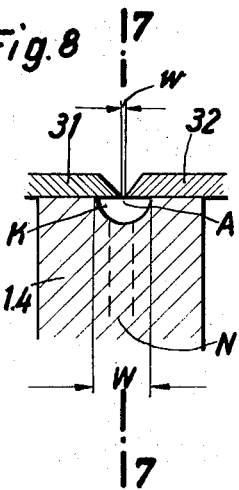
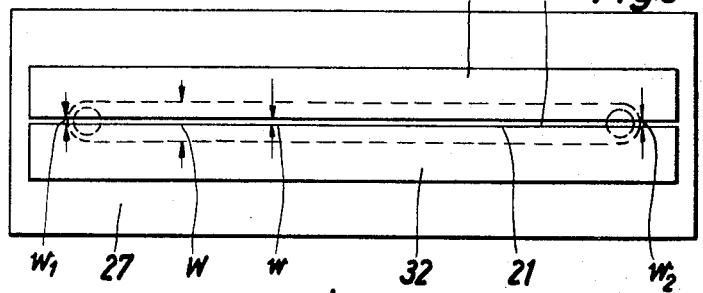
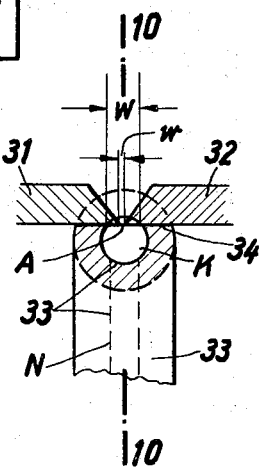
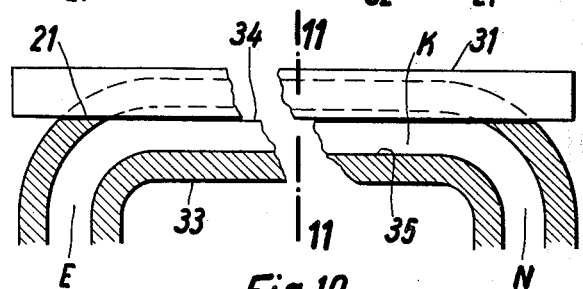
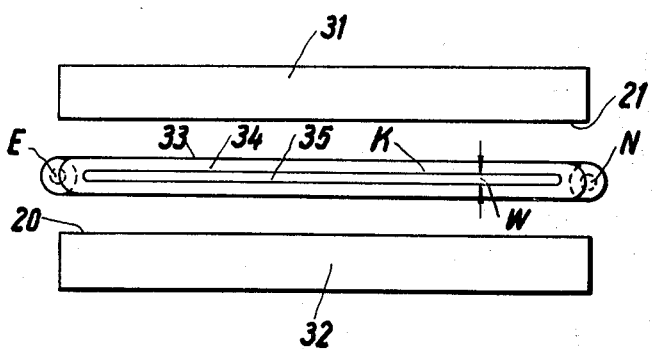

DEVICE FOR SEPARATING MIXTURES OF GASEOUS AND/OR VAPOROUS SUBSTANCES ESPECIALLY FOR SEPARATION OF CARRIER GAS IN DEVICES FOR GASCHROMATOGRAPHY

This is a continuation application under 37 CFR 1.60, of pending prior U.S. Pat. application Ser. No. 185,834 filed on Oct. 1, 1971 and now abandoned of Curt Brunnee.

It has already been proposed (compare U.S. Pat. application Ser. No. 25,919) to form the slit of the first exit by an annular or spiral edge which is arranged with a distance opposite a vis-a-vis-body with an even, cylindrical or conical facing surface. According to the invention the separating effect of the first exit can be considerably improved by that the slit of the first exit is formed by two edges facing oneanother. Thereby interferences of molecular flow by collisions of particles with the walls of the slit are extensively excluded, collisions which are numerous in connection with conventional plane surfaces limiting the slit.

An arrangement which is suitable for manufacture and adjustment can be obtained by a device comprising a basic body preferably made of glass, an elongated trough in said basic body the opening of which is lying in the plane of an adjoining poished upper surface of said basic body, and a plate-like covering body lying upon said and contacting said polished upper surface by an own polished underside and dosing said trough opening down to said slit width w for molecular flow. In such an arrangement the basic body itself does not require high precision-work whereas merely the upper contacting surface must be polished and can be grinded and polished very easily with highest accuracy just as said plate-like covering body with its plane polished underside and edges. Thereby the slit width can be adjustable by displacement of the covering body upon the polished upper surface of the basic body. One of the two edges may be one edge of said elongated trough or the two edges may consist of edges of two halves of said covering body facing oneanother above the opening of the trough within the plane of said contact surfaces.

Preferably the basic body consists of a tube provided with bends towards the same side at the ends of a straight piece the length of which defines the length of said slit. The tube is grinded off at the side opposite said bends thus forming said trough and said adjoining plane polished upper surface contacted by said one-piece or two-piece covering body.

For a better understanding of the invention and to show how the same may be carried into effect, reference will now be made, by way of example, to the accompanying drawings, in which:

FIG. 1 shows a tube-like separating chamber according to the invention, in an axial section along line 1—1 of FIG. 2, FIG. 2 shows a sectional view along line 2—2 of FIG. 1.

FIG. 3 shows a plan view to FIG. 1,

FIG. 4 shows a trough-like separating chamber with a wedge-shaped covering body in a sectional view along line 4—4 of FIG. 5, FIG. 5 shows a sectional view along line 5—5 of FIG. 4, FIG. 6 shows a plan view to FIG. 4, FIG. 7 shows a separating chamber like FIG. 4, however, with a two-piece wedge-shaped covering body, in a sectional view along line 7—7 of FIG. 8, FIG. 8 shows a sectional view along line 8—8 of FIG. 7, FIG. 9 shows a plan view to FIG. 7, FIG. 10 shows a separating chamber like FIG. 7, however, with a tube-shaped basic body, in a sectional view along line 10—10 of FIG. 11, FIG. 11 shows a sectional view along line 11—11 of FIG. 10 and FIG. 12 shows a plan view to FIG. 10 with the two halves of the covering body in exploded position.

In the drawings is not shown the total separating device but only its separating chamber K with its inlet E, first exit A and second exit N. In all embodiments shown in the drawings said first exit A consists of a slit bounded by two edges 20,21 facing oneanother.

In the first embodiment shown in FIG. 1 to 3 said separating chamber K consists of a tube 22 the length of which defines the length L of slit A. To form slit A, tube 22 is provided with a grinded longitudinal wedge-shaped opening 23. The ends of tube 22 are closed by front walls 24,24. This embodiment is suitable especially for a metal construction on account of the necessity to provide a high precision of finish of the inside of tube 22 and of the side walls of said wedge-shaped opening 23.

FIG. 4, 5 and 6 show a construction in which the creation of slit A is defined only by the machining of plane surfaces. This construction is suitable especially for a glass-construction which in numerous applications is preferred on account of its good chemical properties and especially in connection with analysis of substances. In this embodiment as well as in that of FIG. 7 to 12 the separating chamber K consists of a trough the opening of which is adjoined by a polished surface and is closed down to the desired slit width by a covering body contacting precisely said polished surface.

In the embodiment of FIG. 4 to 6 the separating chamber K consists of a trough 26 at the upper side of a block-shaped basic body 27 having an inlet E to the one end and an exit N from the other end of trough 26. The first exit or slit A is formed by the help of a plate-like one-piece covering body 29 which contacts by its polished underside the polished upper surface 28 of the basic body 27 and which has a wedge-shaped side with an edge 21 lying in the plane of the polished surface of contract. The edge 20 facing edge 21 is formed by wirking a grinded and polished edge at the rim of the trough lying opposite said edge 20. The opening of trough 26 with its width W is closed down to the desired slit width w by adjustment of covering body 29.

In the embodiment of FIG. 7 to 9 the covering body consists of two halves 31,32 which contact the upper surface 28 of basic body 27 and have facing edges 20,21 lying within the plane of surface 28 thus forming slit A.

The adjustment of the slit width w is performed by conventional means for fine-adjustment not shown in the drawings.

The inventor has found out that essentially improved results by a higher separation effect may be obtained by providing a slit width w of the first exit A diminishing from said inlet E towards said second exit N rather than by a slit width equal over the whole length of the slit A.

In the drawings the slit width $w$, is shown extreme large. In reality the slit width $w$, is small enough all over the length L of slit A to ensure a molecular flow everywhere between inlet E and second exit N. Thus the width W of the opening of the trough may be 0,5 mm, the width $w_1$ of slit A near inlet E about 10 $\mu$m and the width $w_2$ of slit A near the second exit about 5 $\mu$m which is performed by a non-parallel adjustment of edges 20,21.

FIG. 10 to 12 show a construction which is preferred for a manufacture out of glass. The basic body 33 consists of a tube with bends towards the same side at the ends of a straight piece corresponding to the desired length L of slit A. Tube 33 is grinded off at the side opposite said bends thus forming trough 35 and the adjoining polished upper surface 34 to be contacted by an one-piece or by the shown two-piece covering body 31,32, which for better clearness are shown in exploded position.

It will be appreciated that modifications may be made to the above-described embodiments. Thus the polished surface of the basic body adjoining the trough-shaped separating chamber could have a cylindrical form and could be contacted by cylindrical undersides of a corresponding covering body. The covering body may consist of more than two parallel parts thus bounding two or more parallel slits.

I claim:

1. A device for separating mixtures of gaseous and/or vaporous substances comprising, a cylindrical hollow body having sealed end wall means defining an elongated separating chamber between said end wall means, an inlet through said body communicating with said separating chamber and through which the mixture viscously flows into the separating chamber, a first exit within said body communicating with said separating chamber and formed by an elongated slit in said body opposite said inlet defined by facing edges of said body, and a second exit through said body communicating with said separating chamber for carrying viscous flow.

2. The device of claim 1 wherein said slit is formed by a wedge shaped opening, said facing edges being parallel to define a constant slit width along the length of the slit.

3. The device of claim 2 wherein said inlet and said second exit are disposed at opposite ends of said body adjacent their respective end walls.

4. The device of claim 3 wherein said inlet and second exit are disposed opposite said first exit.

5. A device for separating mixtures of gaseous and/or vaporous substances comprising, a solid body having an elongated trough disposed therein defining an elongated opening in the polished upper surface of said body, said trough defining in part a separating chamber, an inlet through said body at one end of said trough communicating with separating chamber and through which the mixture viscously flows into the separating chamber, a plate means lying upon said upper surface of said body and partially closing said opening formed by the trough to the extent of forming an elongated slit defining a first exit communicating with the separating chamber, and at second exit at the other end of said trough communicating with said separating chamber for carrying viscous flow said separating chamber being positioned between said inlet and said second exit.

6. The device of claim 5 wherein said trough is disposed in a polished upper surface of said solid body and said plate means includes a flat plate having a polished lower surface lying upon the upper surface of said solid body.

7. The device of claim 6 wherein said flat plate has a straight edge, forming with a straight edge defining the trough, a straight elongated slit for the first exit.

8. The device of claim 6 wherein said plate means includes a bipartite plate having a polished lower surface.

9. The device of claim 7 wherein said solid body is in the form of a rectangular block.

10. The device of claim 5 wherein said solid body is tubular having a polished upper surface.

11. The device of claim 7 wherein the upper surface of said solid body is a plane surface and the lower surface of said flat plate is a plane surface, and said body and plate are thus easily moved relative to each other.

* * * * *